(12) United States Patent
Benjamin et al.

(10) Patent No.: US 12,541,624 B2
(45) Date of Patent: Feb. 3, 2026

(54) GENERATING DESIGNS FOR MULTI-FAMILY HOUSING PROJECTS THAT BALANCE COMPETING DESIGN METRICS

(71) Applicant: AUTODESK, INC., San Francisco, CA (US)

(72) Inventors: David Benjamin, Brooklyn, NY (US); Dale Zhao, New York City, NY (US); Lorenzo Villaggi, Brooklyn, NY (US)

(73) Assignee: AUTODESK, INC., San Francisco, CA (US)

( * ) Notice: Subject to any disclaimer, the term of this patent is extended or adjusted under 35 U.S.C. 154(b) by 419 days.

(21) Appl. No.: 17/099,649

(22) Filed: Nov. 16, 2020

(65) Prior Publication Data

US 2021/0150083 A1    May 20, 2021

Related U.S. Application Data

(60) Provisional application No. 62/937,185, filed on Nov. 18, 2019.

(51) Int. Cl.
  *G06F 30/13*   (2020.01)
  *G06F 30/12*   (2020.01)
  *G06F 30/20*   (2020.01)
  *G06F 111/02*  (2020.01)
  *G06F 111/04*  (2020.01)

(52) U.S. Cl.
  CPC .............. *G06F 30/13* (2020.01); *G06F 30/12* (2020.01); *G06F 30/20* (2020.01); *G06F 2111/02* (2020.01); *G06F 2111/04* (2020.01)

(58) Field of Classification Search
  None
  See application file for complete search history.

(56) References Cited

U.S. PATENT DOCUMENTS

| | | | | |
|---|---|---|---|---|
| 6,859,768 B1 * | 2/2005 | Wakelam | ................ | G06F 30/17 703/1 |
| 7,376,542 B2 * | 5/2008 | Beuttel | ................... | G06F 30/20 703/6 |
| 7,996,344 B1 * | 8/2011 | Goel | ....................... | G06F 30/00 706/13 |

(Continued)

OTHER PUBLICATIONS

Beirão, José. CItyMaker: designing grammars for urban design. TU Delft, pp. 276, 2012. (Year: 2012).*

(Continued)

*Primary Examiner* — Akash Saxena
(74) *Attorney, Agent, or Firm* — Artegis Law Group, LLP

(57) ABSTRACT

A design engine is configured to automatically generate designs for multi-family housing projects that simultaneously meet local construction regulations while also meeting specific financial targets. A design generator within the design engine generates a first generation of design options that reflect historical design trends. A design evaluator within the design engine then generates design metrics that quantify various attributes of the different design options. The design generator identifies a subset of the design options that optimally balance some or all of the various design metrics, and then generates a subsequent generation of design options that includes design features derived from the subset of design options.

21 Claims, 6 Drawing Sheets

(56) References Cited

U.S. PATENT DOCUMENTS

| | | | | |
|---|---|---|---|---|
| 9,507,885 | B2* | 11/2016 | Yu | G06F 30/13 |
| 9,690,880 | B2* | 6/2017 | Iorio | G06F 30/00 |
| 10,366,180 | B2* | 7/2019 | Detwiler | G06F 30/13 |
| 10,733,332 | B2* | 8/2020 | Chiang | G06F 30/00 |
| 2005/0114017 | A1* | 5/2005 | Putnam | G09B 29/007 701/532 |
| 2012/0203562 | A1* | 8/2012 | Krebs | G06F 30/13 705/1.1 |
| 2013/0132041 | A1* | 5/2013 | Sigaty | G06Q 50/165 703/1 |
| 2017/0024497 | A1* | 1/2017 | Lyu | G06F 30/20 |
| 2017/0076017 | A1* | 3/2017 | Yu | G06F 30/13 |
| 2018/0268087 | A1* | 9/2018 | Tierney | G06F 30/13 |
| 2019/0050502 | A1* | 2/2019 | Santarone | G06F 30/13 |
| 2021/0241144 | A1* | 8/2021 | Bhattacharya | G16H 50/70 |
| 2024/0087062 | A1* | 3/2024 | Woolf | G06Q 50/16 |

OTHER PUBLICATIONS

Martins, Tathiane AL, et al, "From solar constraints to urban design opportunities: Optimization of built form typologies in a Brazilian tropical city." Energy and Buildings 76 (2014): 43-56. (Year: 2014).*

J. Horn, N. Nafpliotis, Multi-objective optimization using the Niched Paretogenetic algorithm, in: Technical Report 93005, Illinois Genetic Algorithms Lab-oratory, University of Illinois, Urbana, Champaign, 1993. pp. 33 (Year: 1993).*

I. Das, J.E. Dennis, Normal-boundary intersection: a new method for generat-ing the Pareto surface in nonlinear multicriteria optimization problems, SIAMJournal on Optimization 8 (3) (1998) 631-657. (Year: 1998).*

Laurent Magnier et al. "Multiobjective optimization of building design using TRNSYS simulations, genetic algorithm, and Artificial Neural Network", Building and Environment, vol. 45, Issue 3, 2010, pp. 739-746. (Year: 2010).*

Brunetti, Gian Luca. "Optimization as a design strategy. Considerations based on building simulation-assisted experiments about problem decomposition." arXiv preprint arXiv:1407.5615 (2014). (Year: 2014).*

Ostermeyer, Y., Wallbaum, H. & Reuter, F. Multidimensional Pareto optimization as an approach for site-specific building refurbishment solutions applicable for life cycle sustainability assessment. Int J Life Cycle Assess 18, 1762-1779 (2013). https://doi.org/10.1007/s11367-013-0548-6 (Year: 2013).*

* cited by examiner

GENERATING DESIGNS FOR MULTI-FAMILY HOUSING PROJECTS THAT BALANCE COMPETING DESIGN METRICS

CROSS-REFERENCE TO RELATED APPLICATIONS

This application claims the priority benefit of United States provisional patent application titled, "Generative Design Techniques for Multi-Family Housing Projects," filed on Nov. 18, 2019 and having Ser. No. 62/937,185. The subject matter of this related application is hereby incorporated herein by reference.

BACKGROUND

Field of the Various Embodiments

The various embodiments relate generally to computer-aided design technology and, more specifically, to generating designs for multi-family housing projects that balance competing design metrics.

Description of the Related Art

A residential design company or other organization occasionally generates designs on a "speculative" basis by identifying an undeveloped parcel of land that is zoned for residential development and then proposing a design for a multi-family housing project to the landowner who owns the parcel. If the landowner approves of the proposed design, or some version thereof, then the landowner can engage with the residential design organization to develop the parcel according to the proposed design. Once the multi-family housing project is complete, the landowner typically rents or leases the individual housing units within the multi-family housing project to different families in order to provide those families with housing and to generate a recurring revenue stream. In this fashion, the residential design company or other organization benefits landowners who own undeveloped parcels as well as families in need of housing.

A residential design company or other organization that operates on a "speculative" basis usually includes a design team that is tasked with generating different designs for target multi-family housing projects. The design team typically uses computer-aided design (CAD) software or similar software to generate the different designs. One of the challenges faced when generating a given design is how to optimally position various design elements, such as buildings, parking lots and spaces, walkways, and other common design elements relative to the property boundaries of a given undeveloped parcel of land. Another challenge faced when generating a given design is ensuring that the design is compliant with local construction regulations and, accordingly, considered "feasible" to regulators and also ensuring that the design meets specified financial targets and, accordingly, is considered "desirable" to landowners.

The different designs generated by a design team conceptually occupy distinct positions within a multi-dimensional "design space" that encompasses the universe of possible designs that could be generated for a given undeveloped parcel of land. Most of the designs included in the design space are either unfeasible or undesirable or both because those designs do not comply with the relevant construction regulations and/or do not meet the relevant financial targets. A small number of designs included in the design space are considered both feasible and desirable because those designs both comply with the relevant construction regulations and meet the relevant financial targets. Feasible and desirable designs are comparatively scarce in the design space because design features that promote compliance with construction regulations tend to reduce financial performance and, similarly, design features that promote financial performance tend to reduce compliance with regulations. During the design process, the design team explores the design space in an attempt to generate as many designs as possible that are considered both feasible and desirable. As a general matter, the greater the number of feasible and desirable designs that can be generated, the greater the likelihood that an optimal design for a given target project can be determined.

One drawback of current approaches to generating designs for multi-family housing projects is that conventional CAD software is not configured to effectively navigate the design space and steer the design process towards regions of the design space where both feasible and desirable designs reside. In this regard, one limitation of conventional CAD software is that conventional CAD software does not incorporate functionality to automatically identify design features that strike a balance between complying with construction regulations and meeting financial targets when traversing the overall design space. Consequently, designs generated using conventional CAD software are predominately unfeasible, undesirable, or both, which substantially reduces the likelihood of determining an optimal design for a given target project. Another limitation of conventional CAD software is that conventional CAD software does not incorporate functionality to automatically modify a given design based on feedback received from a landowner without adversely impacting either the desirability or the feasibility of the design, which further reduces the likelihood of determining an optimal design for a given target project.

As the foregoing illustrates, what is needed in the art are more effective techniques for generating designs for multi-family housing projects.

SUMMARY

Various embodiments include a computer-implemented method for generating designs for multi-family housing projects via a computer-aided design (CAD) application, including generating, via a design generator included in the CAD application, a first design option based on a first set of design criteria corresponding to a first parcel of land, generating, via a design evaluator included in the CAD application, a first metric that quantifies compliance of the first design option with a first construction regulation, generating, via the design evaluator, a second metric that quantifies performance of the first design option relative to a first design target, performing, via the design generator, a sensitivity analysis on a design space that includes the first design option to determine a plurality of design features that are correlated with the first metric and the second metric, and generating, via the design generator, a second design option that includes the plurality of design features.

At least one technical advantage of the disclosed techniques relative to the prior art is that the disclosed techniques can be incorporated into a CAD application to enable the CAD application to automatically explore a design space to identify regions where regulatory compliance is properly balanced with financial performance. Accordingly, with the disclosed techniques, a CAD application can generate a substantially larger number of designs that are considered both feasible and desirable, relative to a conventional CAD application, thereby increasing the likelihood that an optimal design can generated for a given target multi-family housing project. Another technical advantage is that the disclosed techniques, when incorporated into a CAD application, enable the CAD application to automatically traverse the design space to modify a given design based on landowner feedback without adversely impacting either the feasibility or the desirability of the design. This functionality, which also is not available in conventional CAD applications, increases the likelihood that a landowner accepts the modified design for development. Yet another technical advantage is that the disclosed techniques, when incorporated into a CAD application, enable the CAD application to determine and utilize specific design features that promote both regulatory compliance and financial performance. These technical advantages represent tangible and meaningful technological improvements over conventional CAD applications.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
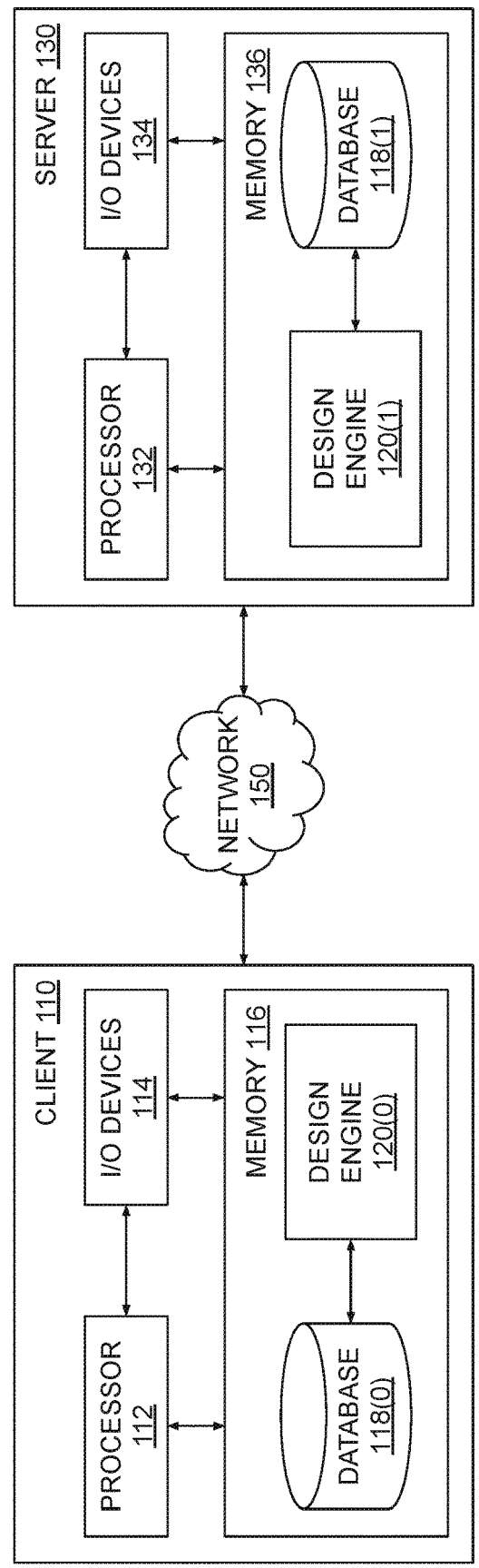
FIG. 1 illustrates a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, a residential design company or other organization that operates on a "speculative" basis typically includes a design team that uses conventional CAD software to generate designs for multi-family housing projects. When generating designs, the design team typically has to work within the guidelines of local construction regulations to generate designs that are considered "feasible" to regulators and also has to work towards specific financial targets to generate designs that are considered "desirable" to landowners. Designs generated using conventional CAD software conceptually occupy distinct positions within a multi-dimensional "design space" that encompasses the universe of possible designs that could be generated for a given undeveloped parcel of land. A very small number of designs included in the design space are considered both feasible and desirable. This situation poses specific difficulties that conventional CAD software cannot effectively address.

In particular, conventional CAD software cannot effectively navigate the design space towards regions of the design space where feasible and desirable designs reside. Consequently, designs generated using conventional CAD software are predominately unfeasible, undesirable, or both, which frequently causes landowners to reject most designs for multi-family housing projects. Conventional CAD software also cannot usually be used to modify a given design to incorporate feedback received from a landowner without adversely impacting either the desirability or the feasibility of the design, further limiting the success rate of designs generated via conventional CAD software.

To address these issues, various embodiments include a design engine that is configured to automatically generate designs for multi-family housing projects that simultaneously meet local construction regulations while also meeting specific financial targets. The design engine includes a design analyzer, a site analyzer, a design generator, and a design evaluator. The site analyzer generates design criteria based on relevant construction regulations associated with a given parcel of land. The design generator generates design options that reflect the design trends while also complying with the construction regulations set forth in the design criteria.

The design evaluator quantifies various attributes of the different design options, including parcel data that describes geometric aspects of the parcel of land, structural data that describes the structural configuration of any given design option, and materials data that describes construction materials used to implement the structural configuration. The design evaluator includes a geometric evaluator that performs a geometric analysis on the design options using the aforesaid datasets to generate a set of structural metrics. A given structural metric represents the degree to which a corresponding design option meets specific geometric criteria, including those associated with construction regulations. The design evaluator also includes a financial evaluator that performs a performance analysis on the design options using the aforesaid datasets to generate a set of financial metrics. A given financial metric represents the degree to which a corresponding design option performs according to a specific financial target.

Using the different design metrics described above, the design generator executes a Pareto analysis on the design options to identify a subset of those design options that resides along a Pareto frontier within a design space that encompasses a universe of possible design options. The subset of design options optimally balances some or all of the various design metrics. The design generator may eliminate certain design options that optimize the design metrics but fail to meet one or more design criteria. The design generator then executes a recombination process with the subset of design options to generate a new generation of design options. In so doing, the design generator extracts design features from the subset of design options and computes different combinations of those design features to generate new and different design options. The design generator may evaluate the design space mentioned above in order to determine the specific design features that most contribute to improvement across the design metrics.

The design engine and design evaluator interoperate iteratively in the above manner to generate successively improved generations of design options. During or after any given iteration, one or more of the design options can be modified based on user input. Subsequently, as needed, the modified design option(s) can be brought into compliance with construction regulations and/or modified to improve financial performance.

At least one technical advantage of the disclosed techniques relative to the prior art is that the disclosed techniques can be incorporated into a CAD application to enable the CAD application to automatically explore a design space to identify regions where regulatory compliance is properly balanced with financial performance. Accordingly, with the disclosed techniques, a CAD application can generate a substantially larger number of designs that are considered both feasible and desirable, relative to a conventional CAD application, thereby increasing the likelihood that an optimal design can generated for a given target multi-family housing project. Another technical advantage is that the disclosed techniques, when incorporated into a CAD application, enable the CAD application to automatically traverse the design space to modify a given design based on landowner feedback without adversely impacting either the feasibility or the desirability of the design. This functionality, which also is not available in conventional CAD applications, increases the likelihood that a landowner accepts the modified design for development. Yet another technical advantage is that the disclosed techniques, when incorporated into a CAD application, enable the CAD application to determine and utilize specific design features that promote both regulatory compliance and financial performance. These technical advantages represent tangible and meaningful technological improvements over conventional CAD applications.

System Overview

FIG. 1 illustrates a system configured to implement one or more aspects of the various embodiments. As shown, a system 100 includes a client 110 and a server 130 coupled together via a network 150. Client 110 or server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others.

As further shown, client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and/or a touchscreen, among others.

Memory 116 includes any technically feasible storage media configured to store data and software applications, such as, for example, a hard disk, a random-access memory (RAM) module, and/or a read-only memory (ROM). Memory 116 includes a database 118(0) and a design engine 120(0). Database 118(0) stores various data that is processed by design engine 120(0). Design engine 120(0) is a software application that, when executed by processor 112, interoperates with a corresponding software application executing on server 130 to perform various operations described in greater detail herein.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, and/or a touchscreen, among others.

Memory 136 includes any technically feasible storage media configured to store data and software applications, such as, for example, a hard disk, a RAM module, and/or a ROM. Memory 136 includes a database 118(1) and a design engine 120(1). Database 118(1) stores various data that is processed by design engine 120(1). Design engine 120(1) is a software application that, when executed by processor 132, interoperates with design engine 120(0) executing on client 110 to perform the various operations described in greater detail herein.

As a general matter, databases 118(0) and 118(1) represent separate portions of a distributed storage entity. Thus, for simplicity, databases 118(0) and 118(1) are collectively referred to hereinafter as database 118. Similarly, design engines 120(0) and 120(1) represent separate portions of a distributed software entity that is configured to perform any and all of the inventive operations described herein. Thus, for simplicity, design engines 120(0) and 120(1) are collectively referred to hereinafter as design engine 120.

In operation, design engine 120 is configured to automatically generate design options for multi-family housing projects that can be constructed on a given parcel of land. Design engine 120 is configured to generate the design options based on historical design trends as well as local construction regulations that govern development of the parcel of land. Design engine 120 analyzes the design options to identify those with projected financial performance that may be desirable to a landowner who owns the undeveloped parcel of land. Design engine 120 is further configured to incorporate into the identified design options various types of modifications that may be suggested by the landowner while maintaining compliance with local construction regulations. In this manner, design engine 120 is configured to support a "speculative" approach to multi-family housing project design and development.

Software Overview

Figure 2:
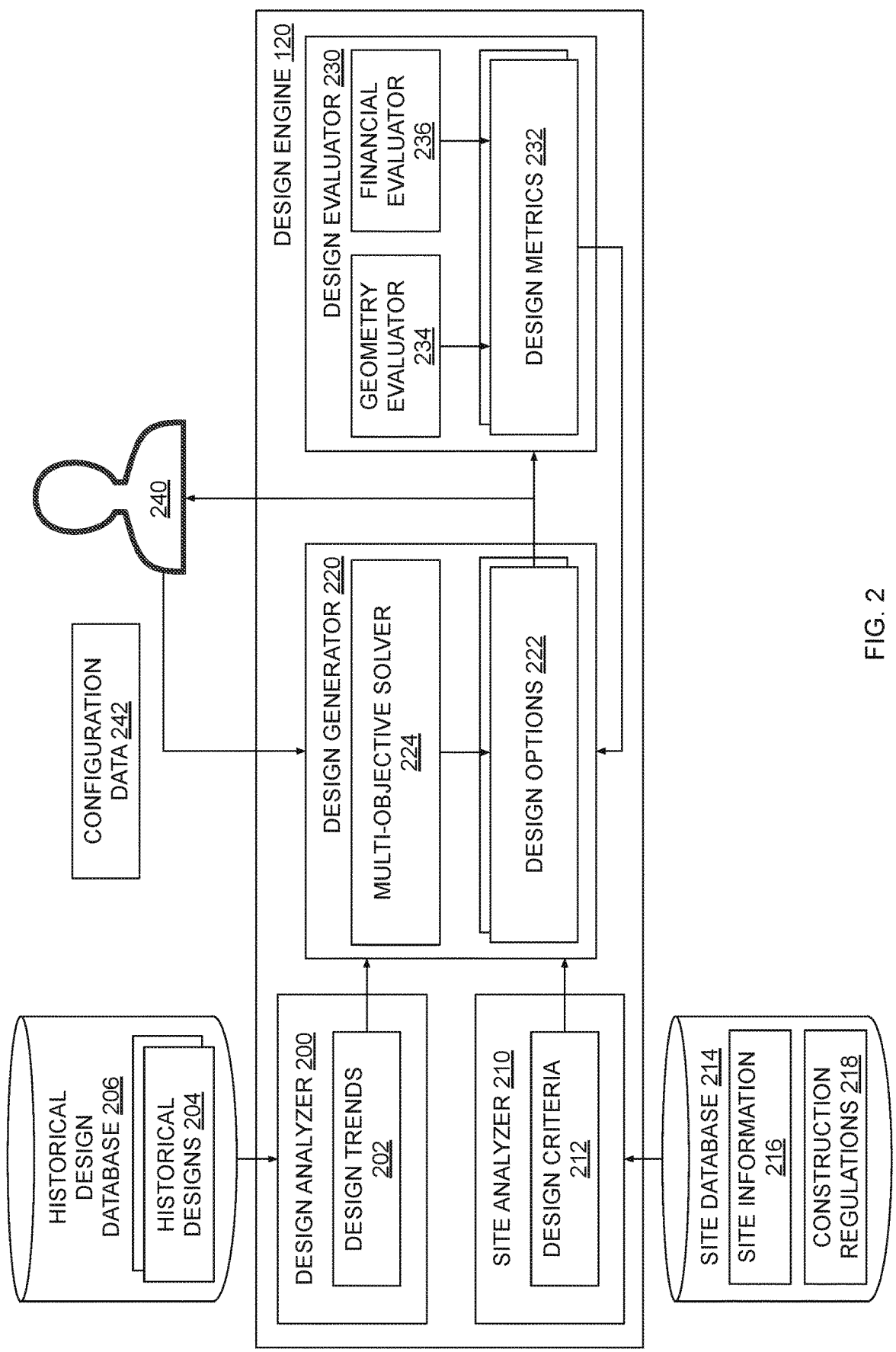
FIG. 2 is a more detailed illustration of the design engine of FIG. 1, according to various embodiments.

FIG. 2 is a more detailed illustration of the design engine of FIG. 1, according to various embodiments. As shown, design engine 120 includes a design analyzer 200, a site analyzer 210, a design generator 220, and a design evaluator 230. These various software modules are configured to interoperate with one another in order to implement the various operations performed by design engine 120.

Design analyzer 200 is configured to generate design trends 202 based on an analysis of historical designs 204 that reside within historical design database 206. Historical designs 204 generally include designs for multi-family housing projects that were previously accepted by landowners and used to develop corresponding parcels of land. Design trends 202 generally include geometric construction rules that can be used to generate designs having similar features to historical designs 204. Design analyzer 200 generates design trends 202 by performing a geometric analysis of historical designs 204 to extract a set of features from those designs and then parameterizing the extracted features to produce a set of parametric values, Design analyzer 200 determines various relationships between individual subsets of parametric values to generate one or more design trends 202.

For example, design analyzer 200 could analyze a set of historical designs 204 in which various apartment complexes are aligned in an East-West direction. Design analyzer 200 could extract an alignment feature from each historical design 204 and then parameterize the extracted features to generate a set of values representing the alignment of the various apartment complexes. Design analyzer 200 could then determine that the various parametric values are correlated with each other and generate a design trend 202 indicating that an East-West alignment for apartment complexes is preferable when generating design options 222. Persons skilled in the art will understand how these techniques can be applied to generate design trends 202 representing any technically feasible feature of historical designs 204.

Site analyzer 210 is configured to generate design criteria 212 based on an analysis of site information 214 and construction regulations 216 stored in site database 218. Site information 214 includes data and metadata associated with a given parcel of land, including a geographic location, a set of property boundaries, a property area value, geometric attributes of the parcel such as topology and/or topography, and so forth. Construction regulations 216 include various zoning regulations, building codes, land use requirements, and other types of governances that dictate how development of the parcel of land can and/or should occur. Construction regulations 216 may be applicable based on the geographic location of the parcel of land or specifically applicable to the parcel of land for various reasons.

Site analyzer 210 processes site information 214 and construction regulations 216 to synthesize a set of design criteria 212 that feasible designs should meet. A given design criterion 212 may include a design objective or a design constraint. A design objective could be, for example, that designs should maximize the amount of area that is devoted to buildings versus landscaping or other design features. A given design constraint could be, for example, that designs should not include buildings that are placed outside of property boundaries or exceed a given height.

Design generator 220 is configured to process design trends 202 and design criteria 212 in order to generate successive generations of design options 222. Each design option 222 describes a multi-family housing project corresponding to the parcel of land described in site information 214. Design generator 220 performs various geometric construction techniques to generate, for each design option 222, geometry that describes one or more buildings, parking lots and spaces, walkways, landscaping features, and other design elements typically found in multi-family housing projects. In one embodiment, design generator 220 may include a multi-objective solver 224 that is configured to implement a set of mathematical optimization algorithms to generate the various design elements found in each design option 222. Design generator 220 is described in greater detail below in conjunction with FIG. 3.

Design evaluator 230 is configured to generate various design metrics 232 that quantify specific attributes of design options 222. In particular, design evaluator 230 includes a geometry evaluator 234 that evaluates geometric attributes of design options 222 as well as a financial evaluator 236 that evaluates financial attributes of design options 222. Geometric evaluator 234 can generate any technically feasible type of metric associated with the geometry of a given design option 222, including the total square footage of the design option, the overall habitable volume of the design option, the floor area ratio (FAR) of the design option, the building coverage ratio (BCR) of the design option, and so forth. Financial evaluator 236 can generate any technically feasible type of metric that describes financial projections for a given design option 222, including the construction cost of the design option, the projected rental revenue of the design option, the return-on-investment (ROI) associated with the design option, and so forth. In various embodiments, geometric evaluator 234 and/or financial evaluator 236 can be used to quantify the degree to which design criteria 212 are met. Design evaluator 230 is described in greater detail below in conjunction with FIG. 3.

Design evaluator 230 generates design metrics 232 via geometry evaluator 234 and financial evaluator 236 and then provides those design metrics to design generator 220 in order to inform the generation of additional design options 222. In this manner, design generator 220 and design evaluator 230 operate iteratively in order to generate successive generations of design options 222 having design metrics 232 that improve over time while continuing to meet design criteria 212 and construction regulations 216. When certain convergence criteria are met, design generator 220 outputs design options 222 to user 240. In various embodiments, multi-objective solver 224 implements one or more evolutionary and/or genetic algorithms in order to modify design options 222, based on corresponding design metrics 232, to generate successive generations of design options 222. Via the above techniques, design generator 220 is configured to explore a vast multi-dimensional design space that includes a multitude of design options 222 having widely varying characteristics. With conventional CAD software, only a small subset of this design space is accessible, leading to designs that are either unfeasible, undesirable, or both.

In one embodiment, design generator 220 is configured to obtain configuration data 242 from a user 240 and to then generate and/or modify design options 222 based on that data. Configuration data 242 may include any technically feasible type of data that can be used to guide the generation of design options 222, including financial targets for design options 222, design preferences related to the layout and/or orientation of buildings within the multi-family housing project, target occupancy metrics for the multi-family housing project, design rules and/or constraints that reflect various aesthetic preferences of user 240 and/or the landowner, landowner feedback in general, and so forth.

In various embodiments, design engine 120 may perform computer simulations of various design elements included in each design option 222 to generate one or more designs. Design engine 120 may then render those designs for display to a user via a display device. Design engine 120 may also generate a graphical user interface (GUI) and render the GUI for display to the user via the display device. Using one or more input devices, the user may then interact with the rendered design(s) using the GUI in order to input feedback, alter design criteria, and make other modifications to those designs. Design engine 120 may then run further simulations to generate additional design options 222 and then render updated designs for display to the user.

Advantageously, the techniques described above can be incorporated into CAD software to enable the CAD software to automatically generate and/or modify designs for multi-family housing projects that balance the competing objectives of complying with complex construction regulations and simultaneously achieving target financial projections. Accordingly, CAD software that implements the disclosed techniques can reliably and deterministically generate designs for multi-family housing projects that are considered both feasible from a regulatory standpoint and desirable from a financial performance perspective.

Balancing Competing Design Metrics

Figure 3:
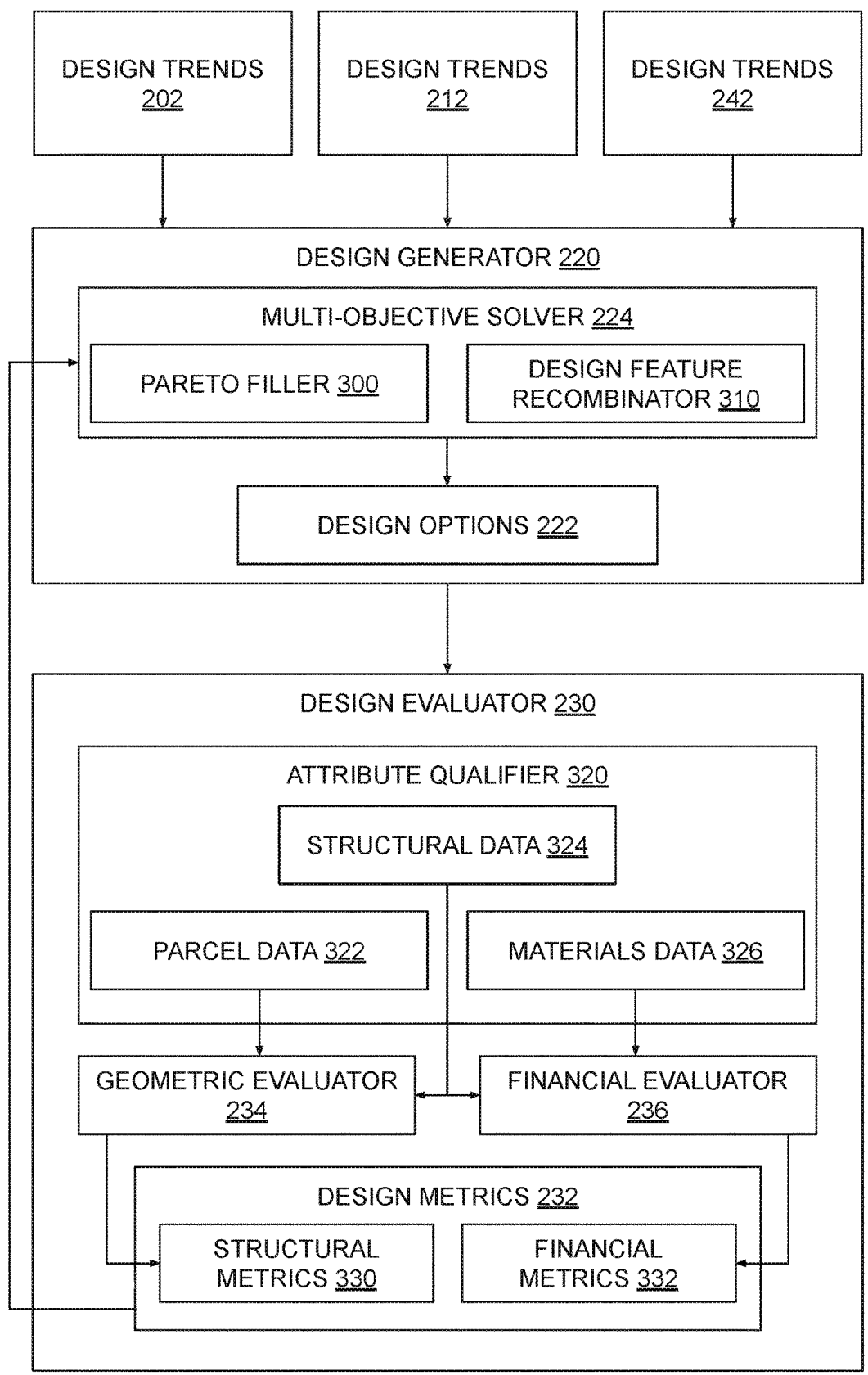
FIG. 3 is a more detailed illustration of the design generator and the design evaluator of FIG. 2, according to various embodiments.

FIG. 3 is a more detailed illustration of the design generator and the design evaluator of FIG. 2, according to various embodiments. As shown, design generator 220 includes a Pareto analyzer 300 and a design feature recombinator 310 that reside within multi-objective solver 224. As also shown, design evaluator 230 includes an attribute quantifier 320. Design generator 220 and design evaluator 230 are configured to interoperate in an iterative matter to generate successive generations of design options 222, as mentioned above and described in greater detail herein.

During an initial iteration, design generator 220 generates design options 222 based on design trends 202, design criteria 212, and configuration data 242 according to the techniques described in conjunction with FIG. 2. Design evaluator 230 then implements attribute quantifier 320 to quantify various attributes of those design options. In so doing, design evaluator 230 generates parcel data 322 that describes geometric aspects of the parcel of land, structural data 324 that describes the structural configuration of design options 222, and materials data 326 that describes construction materials used to implement that structural configuration. In one embodiment, attribute quantifier 320 may generate and/or operate on a parameterized version of each design option 222.

Geometric evaluator 234 performs a geometric analysis on each design option 222 using parcel data 322, structural data 324, and material data 326 to generate structural metrics 330 included in design metrics 232. Each structural metric 330 represents the degree to which a corresponding design option 222 meets specific geometric criteria, including those associated with construction regulations. For example, a given structural metric 330 could indicate a degree to which a design option 222 complies with a maximum FAR value associated with the parcel of land. In another example, a given structural metric 330 could indicate a degree to which a building design included in a design option 222 intersects a slant plane associated with the parcel of land.

Financial evaluator 236 performs a performance analysis on each design option 222 using parcel data 322, structural data 324, and material data 326 to generate financial metrics 332 included in design metrics 232. Each financial metric 332 represents the degree to which a corresponding design option 222 performs according to a specific financial target. For example, a given financial metric 332 could indicate a total construction cost associated with a design option 222. In another example, a given financial metric 332 could indicate a projected ROI of a multi-family housing project that is built according to the design option 222, once some or all units of that housing project are leased to tenants. In one embodiment, configuration data 242 may include one or more financial targets corresponding to each financial metric 332.

Design evaluator 230 provides design metrics 232 to design generator 220, thereby initiating a subsequent iteration. During the subsequent iteration, design generator 220 implements Pareto analyzer 300 and design feature recombinator 310 to analyze design options 222 using design metrics 232 in order to generate a subsequent generation of design options 222.

Pareto analyzer 300 analyzes design options 222 based on some or all design metrics 232 to determine a subset of design options 222 that reside along a Pareto frontier relative to those design metrics. Each design option 222 included in the subset may be considered Pareto efficient relative to other design options 222 because the design metrics corresponding to those design options 222 strike an optimal balance relative to one another. Pareto analyzer 300 can perform the above analysis based on any combination of design metrics 232 to determine any subset of design options 222 considered Pareto efficient. Persons skilled in the art will understand that both "Pareto frontier" and "Pareto efficient" are well known terms in the field of multi-objective optimization. In one embodiment, Pareto analyzer 300 may be configured to filter out some design options 222 from a given subset based on the values of specific design metrics 232. The operation of Pareto analyzer 300 is described in greater detail by way of example below in conjunction with FIGS. 4A-5B.

Design feature recombinator 310 performs a sensitivity analysis using the subset of design options 222 determined by Pareto analyzer 300 to identify specific design features that contribute to the Pareto efficiency of each design option 222 included in the subset. The Pareto efficiency of a given design option 222 included in the subset can be considered "sensitive" to some or all of these design features. In performing the sensitivity analysis, design feature recombinator 310 can compare the different design options 222 included in the subset to one another in order to determine correlations between design features, which may indicate that those design features contribute to the Pareto efficiency of the associated design options 222. Design feature recombinator 310 can also compare design options 222 included in the subset of design options 222 to the design options 222 that are not included in the subset of design options 222 to determine differences between design features, which may indicate that certain design features adversely affect the Pareto efficiency of the associated design options 222. Design feature recombinator 310 may perform any additional technically feasible analyses in order to determine any specific design features that generally correspond to the Pareto efficiency of any given design option 222. Design feature recombinator 310 then implements a recombination process with the set of design features to produce a subsequent generation of design options 222. Design feature recombinator 310 may implement any technically feasible approach when doing so, including recombination and/or mutation techniques derived from genetic programming, multi-objective optimization, artificial intelligence, and so forth.

Design generator 220 provides the subsequent generation of design options 222 to design evaluator 230, and the process described above then repeats across multiple iterations and multiple successive generations of design options. Each successive generation of design options 222 may have improved design metrics 232 relative to a previous generation of design options 222.

In one embodiment, design generator 220 and design evaluator 230 may interoperate in the manner described to explore the multi-dimensional design space discussed above in conjunction with FIG. 2. During exploration of the design space, successive generations of design options 222 may increasingly reside closer to regions of the design space that include design options considered both feasible from a regulatory standpoint and desirable from a financial performance perspective. Design generator 220 explores the design space via the sensitivity analysis discussed above to traverse the design space from regions associated with low Pareto efficiency, and therefore unfavorable design metrics 232, towards regions with higher Pareto efficiency, and therefore favorable design metrics 232. The interoperation of Pareto analyzer 300 and design feature recombinator 310 is described in greater detail below in conjunction with FIGS. 4A-5B.

Figures 4A, 4B:
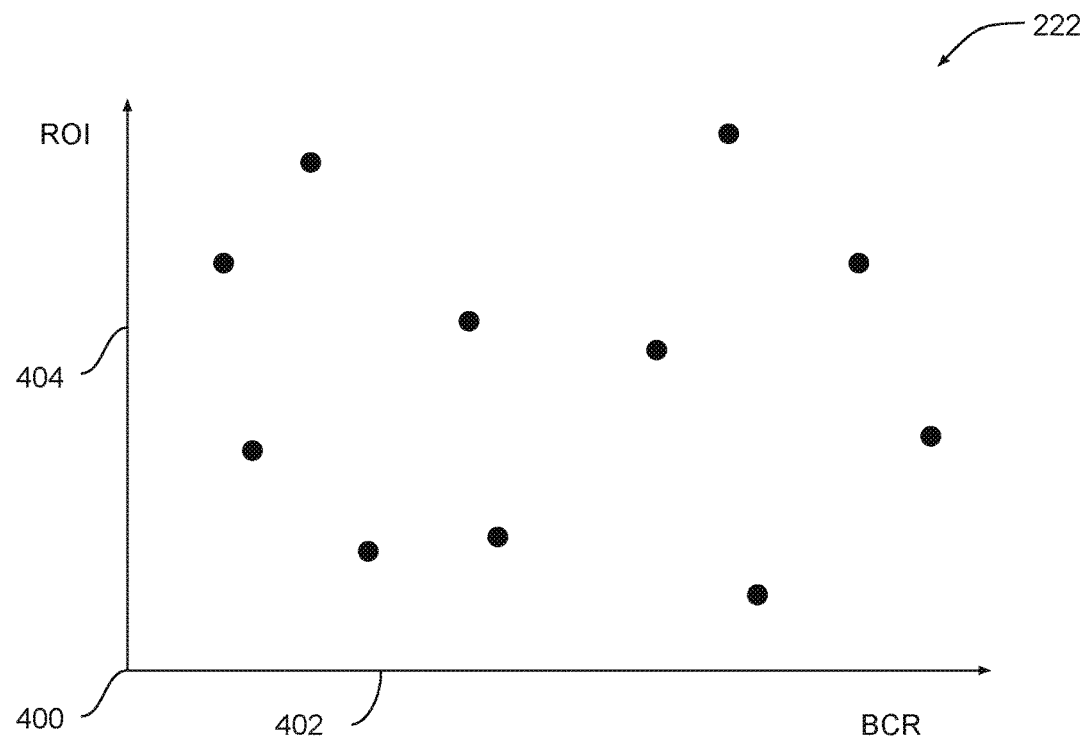
FIGS. 4A-4B illustrate how the design generator of FIG. 2 automatically balances a set of competing design metrics, according to various embodiments.

FIGS. 4A-4B illustrate how the design generator of FIG. 2 automatically balances a set of competing design metrics, according to various embodiments. As shown in FIG. 4A, a plot 400 includes BCR axis 402, ROI axis 404, and design options 222. Design options 222 are arranged within plot 400 according to respective BCR and ROI values. As noted above, design evaluator 230 may compute BCR and ROI values for each design option 222 when generating design metrics 232. Design options with BCR values that fall within a specific range of values are considered feasible while those falling outside of this range of values are considered unfeasible. In addition, design options 222 with higher ROI values are generally considered more desirable than design options 222 with lower ROI values. Accordingly, the position of each design option 222 within plot 400 indicates, to a certain degree, the feasibility and desirability of the corresponding design option 222.

One complication that can occur when generating designs for multi-family housing projects is that increasing the ROI value of a given design option, which generally increases the desirability of that design option, tends to increase the BCR value of that design, which can limit the feasibility of the design. As such, ROI and BCR values are considered competing design metrics and design tradeoffs typically need to be made to generate designs that adequately balance higher ROI values against reasonable BCR values. Conventional CAD software does not incorporate functionality for generating designs that balance these competing design metrics. Further, design teams are unable to manually generate such designs because the number of design variables that need to be considered is typically unfathomable. To address these issues, design generator 220 implements the techniques illustrated in FIG. 4B.

Referring now to FIG. 4B, Pareto analyzer 300 within design generator 220 computes a Pareto frontier 420 that includes design options 222 which optimally balance BCR and ROI values relative to other design options 222. Pareto analyzer 300 also filters design options 222 that reside along Pareto frontier 420 to eliminate design options 222 having disallowed BCR values that fall beneath minimum BCR value 430 or above maximum BCR value 432, In this manner, Pareto analyzer 300 computes subset 422 of design options 222. Design feature recombinator 310 subsequently extracts a set of design features from subset 422 that may promote both desirability and feasibility, and then generates a subsequent generation of design options 222 that incorporates these design features. Via the above techniques, Pareto analyzer 300 and design feature recombinator 310 traverse the design space to generate design options 222 that confer improvements over previous generations of design options 222 relative to both BCR and ROI. These techniques can be applied to balance other competing design metrics as well, as described in greater detail below in conjunction with FIGS. 5A-5B.

Figure 5A:
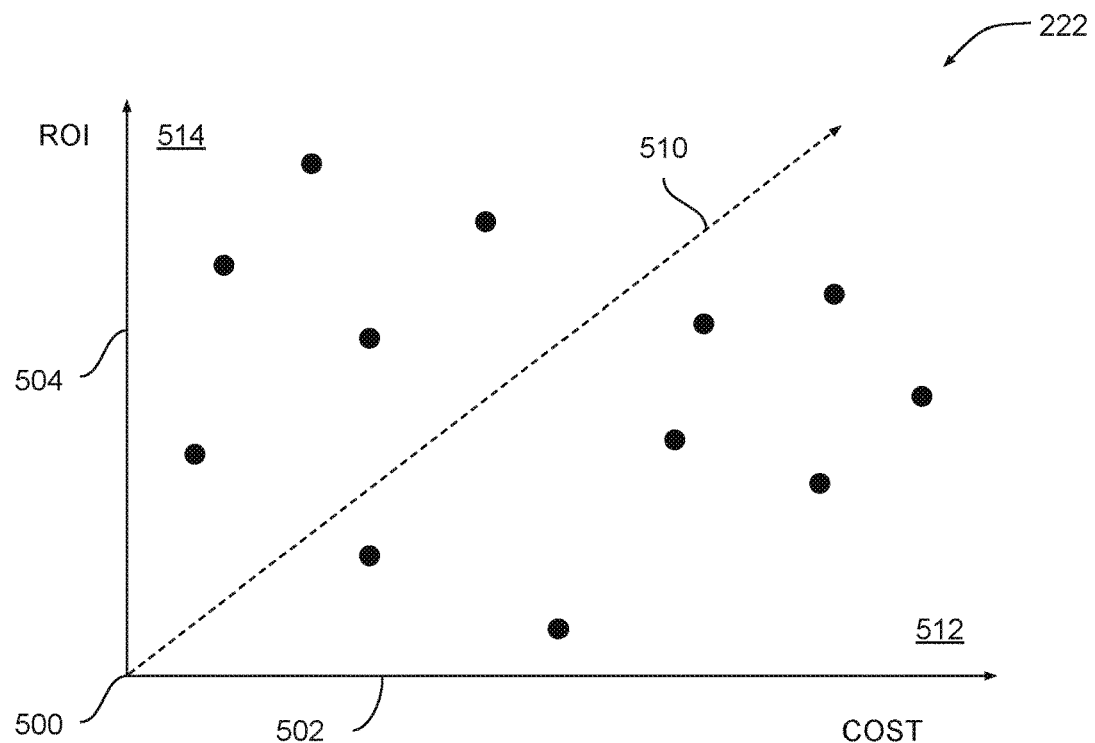
FIGS. 5A-5B illustrate how the design generator of FIG. 2 automatically balances another set of competing design metrics, according to other various embodiments.
Figure 5B:
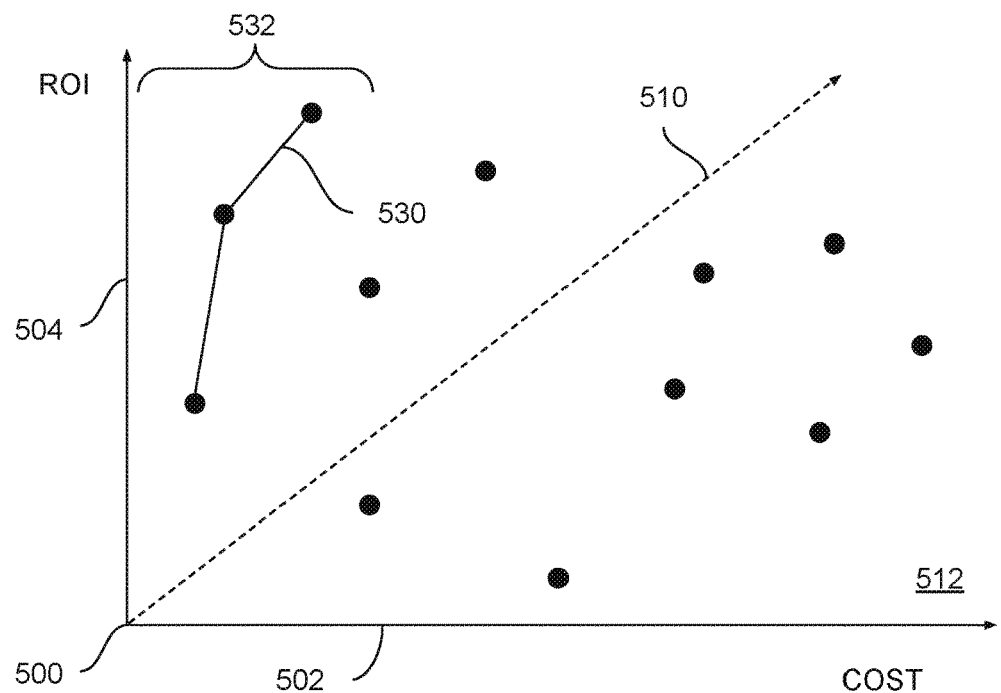

FIGS. 5A-5B illustrate how the design generator of FIG. 2 automatically balances another set of competing design metrics, according to various other embodiments. As shown in FIG. 5A, a plot 500 includes cost axis 502, ROI axis 504, and design options 222. Design options 222 are arranged within plot 500 according to respective cost and ROI values. As noted above, design evaluator 230 may compute cost and ROI values for each design option 222 when generating design metrics 232. Design options with lower cost values are generally considered more desirable than design options 222 with higher cost values, while design options 222 with higher ROI values are generally considered more desirable than design options 222 with lower ROI values. As such, the position of each design option 222 shown indicates, to a certain degree, the desirability of the corresponding design option 222.

An issue that commonly arises when generating designs for multi-family housing projects is that increasing the ROI value of a given design option, which generally increases the desirability of that design option, tends to increase the cost value of that design, which in turn reduces the desirability of the design. Accordingly, ROI and cost values are considered competing design metrics and design tradeoffs typically need to be made to generate designs that adequately balance higher ROI values against lower cost values. Conventional CAD software does not incorporate functionality for generating designs that balance these competing design metrics. In addition, design teams are unable to manually generate such designs for the reasons discussed above in conjunction with FIG. 4A; specifically, because the number of design variables that need to be considered is typically unfathomable. In practice, design teams typically can only generate designs that reside beneath divider 510, within region 512, and are therefore considered only modestly desirable. To address these issues, design generator 220 implements the analysis illustrated in FIG. 5B.

Referring now to FIG. 5B, Pareto analyzer 300 within design generator 220 computes a Pareto frontier 530 that includes design options 222 which optimally balance cost values and ROI values relative to other design options 222. Pareto analyzer 300 may also filter design options 222 that reside along Pareto frontier 530 to eliminate any design options 222 that potentially reside in region 512. Although such designs may reside along Pareto frontier 530 and therefore balance cost and ROI, these design options generally have ROI values that are too low to promote desirability, despite also having very low cost values. In this manner, Pareto analyzer 300 computes subset 532 of design options 222 that reside in region 514. In one embodiment, design options 222 included in region 512 may occupy one region of the design space, while design options 222 included in region 514 may occupy another region of the design space. Design feature recombinator 310 extracts a set of design features from subset 532 that may promote desirability and then generates a subsequent generation of design options 222 that incorporates these design features. Via these techniques, Pareto analyzer 300 and design feature recombinator 310 traverse the design space to generate design options 222 that confer improvements over previous generations of design options 222 relative to both cost and ROI.

Referring generally to FIGS. 4A-5B, persons skilled in the art will understand how the disclosed techniques can be implemented to generate design options 222 that balance any combination of design metrics 232. Furthermore, persons skilled in the art will understand that the disclosed techniques can be implemented across N dimensions in order to generate design options 222 that balance N potentially competing design metrics 232, N being any integer value. In various embodiments, design generator 220 may implement the above techniques when modifying design options 222 based on configuration data 242, thereby allowing design options 222 to incorporate landowner feedback and then optimized relative to one or more design metrics 232.

Figure 6:
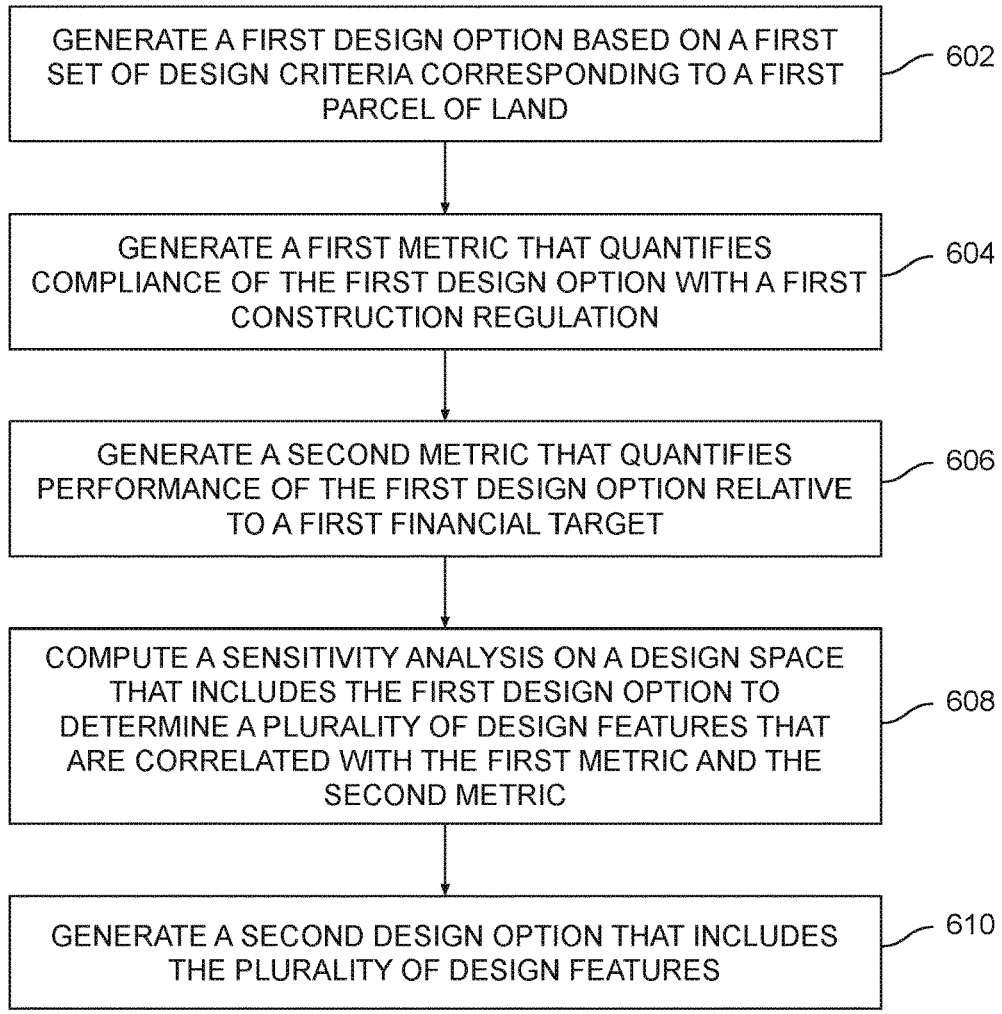
FIG. 6 is a flow diagram of method steps for generating design options for a multi-family housing project, according to various embodiments.

FIG. 6 is a flow diagram of method steps for generating design options for a multi-family housing project, according to various embodiments. Although the method steps are described in conjunction with the systems of FIGS. 1-5B, persons skilled in the art will understand that any system configured to perform the method steps in any order falls within the scope of the present embodiments.

As shown, a method 600 begins at step 602 where design generator 220 generates a first design option 222 based on design criteria 212 corresponding to a first parcel of land. Design generator 220 also processes design trends 202 to generate the first design option 222 and optionally configuration data 242. The first design option 222 is generally included in a first generation of design options 222 that may include a significant fraction of design options 222 that are considered unfeasible, undesirable, or both.

At step 604, design evaluator 330 generates a first metric that quantifies compliance of the first design option 222 with a first construction regulation. In particular, geometric evaluator 234 within design evaluator performs a geometric analysis on the first design option 222 using parcel data 312, structural data 314, and material data 316 to generate structural metrics 330. Each structural metric 332 represents the degree to which the first design option 222 meets specific geometric criteria, including those associated with construction regulations. For example, a given structural metric 330 could indicate a degree to which the first design option 222 complies with a maximum FAR value associated with the parcel of land.

At step 606, design evaluator 330 generates a second metric that quantifies performance of the first design option 222 relative to a first financial target. Specifically, financial evaluator 236 within design evaluator 330 executes a performance analysis on the first design option 222 using parcel data 312, structural data 314, and material data 316 to generate financial metrics 332 included in design metrics 232. Each financial metric 332 represents the degree to which the first design option 222 performs according to a specific financial target. For example, a given financial metric 332 could indicate a total construction cost associated with the first design option 222.

At step 608, design generator 220 computes a sensitivity analysis on a design space that includes the first design option 222 to determine a plurality of design features that are correlated with the first metric and the second metric. In so doing, design feature recombinator 310 within design generator 220 identifies specific design features of the first design option 222 that contribute to the Pareto efficiency of that design option 222 relative to design metrics 232. These design features correspond to the position of the first design option 222 within the design space.

At step 610, design generator 220 generates a second design option that includes the plurality of design features. In particular, design feature recombinator 310 within design generator implements a recombination process with the design features derived from the first design option 222 to produce a subsequent generation of design options 222 that includes the second design option 222. Design feature recombinator 310 may implement any technically feasible approach when doing so, including techniques derived from genetic programming, multi-objective optimization, and so forth. In one embodiment, only a subset of the design options 222 included in the first generation of design options 222 includes the plurality of design features, while each design option 222 included in the subsequent generation of design options 222 includes the plurality of design features.

Via the method 600, design generator 220 and design evaluator 230 interoperate to explore a multi-dimensional design space and generate successive generations of design options 222 that increasingly reside closer to regions of the design space where feasible and desirable design options 222 reside.

In sum, a design engine is configured to automatically generate designs for multi-family housing projects that simultaneously meet local construction regulations while also meeting specific financial targets. The design engine includes a design analyzer, a site analyzer, a design generator, and a design evaluator. The site analyzer generates design criteria based on relevant construction regulations associated with a given parcel of land. The design generator generates design options that reflect the design trends while also complying with the construction regulations set forth in the design criteria.

The design evaluator quantifies various attributes of the different design options, including parcel data that describes geometric aspects of the parcel of land, structural data that describes the structural configuration of any given design option, and materials data that describes construction materials used to implement the structural configuration. The design evaluator includes a geometric evaluator that performs a geometric analysis on the design options using the aforesaid datasets to generate a set of structural metrics. A given structural metric represents the degree to which a corresponding design option meets specific geometric criteria, including those associated with construction regulations. The design evaluator also includes a financial evaluator that performs a performance analysis on the design options using the aforesaid datasets to generate a set of financial metrics. A given financial metric represents the degree to which a corresponding design option performs according to a specific financial target.

Using the different design metrics described above, the design generator executes a Pareto analysis on the design options to identify a subset of those design options that resides along a Pareto frontier within a design space that encompasses a universe of possible design options. The subset of design options optimally balances some or all of the various design metrics. The design generator may eliminate certain design options that optimize the design metrics but fail to meet one or more design criteria. The design generator then executes a recombination process with the subset of design options to generate a new generation of design options. In so doing, the design generator extracts design features from the subset of design options and computes different combinations of those design features to generate new and different design options. The design generator may evaluate the design space mentioned above in order to determine the specific design features that most contribute to improvement across the design metrics.

At least one technical advantage of the disclosed techniques relative to the prior art is that the disclosed techniques can be incorporated into a CAD application to enable the CAD application to automatically explore a design space to identify regions where regulatory compliance is properly balanced with financial performance. Accordingly, with the disclosed techniques, a CAD application can generate a substantially larger number of designs that are considered both feasible and desirable, relative to a conventional CAD application, thereby increasing the likelihood that an optimal design can generated for a given target multi-family housing project. Another technical advantage is that the disclosed techniques, when incorporated into a CAD application, enable the CAD application to automatically traverse the design space to modify a given design based on landowner feedback without adversely impacting either the feasibility or the desirability of the design. This functionality, which also is not available in conventional CAD applications, increases the likelihood that a landowner accepts the modified design for development. Yet another technical advantage is that the disclosed techniques, when incorporated into a CAD application, enable the CAD application to determine and utilize specific design features that promote both regulatory compliance and financial performance. These technical advantages represent tangible and meaningful technological improvements over conventional CAD applications.

1. Some embodiments include a computer-implemented method for generating designs for multi-family housing projects via a computer-aided design (CAD) application, the method comprising generating, via a design generator included in the CAD application, a first design option based on a first set of design criteria corresponding to a first parcel of land, generating, via a design evaluator included in the CAD application, a first metric that quantifies compliance of the first design option with a first construction regulation, generating, via the design evaluator, a second metric that quantifies performance of the first design option relative to a first design target, performing, via the design generator, a sensitivity analysis on a design space that includes the first design option to determine a plurality of design features that are correlated with the first metric and the second metric, and generating, via the design generator, a second design option that includes the plurality of design features.

2. The computer-implemented method of clause 1, wherein generating the first metric comprises computing a first value derived from one or more geometric attributes of a building design included in the first design option, computing a second value derived from one or more geometric attributes associated with the first parcel of land, computing a ratio between the first value and the second value.

3. The computer-implemented method of any of clauses 1-2, wherein the first metric comprises a floor area ratio (FAR) or a building coverage ratio (BCR), and the first construction regulation comprises a maximum value for the first metric.

4. The computer-implemented method of any of clauses 1-3, wherein generating the second metric comprises computing a first value derived from one or more housing units included in a building design set forth in the first design option, computing a second value derived from one or more structural elements according to which the first design option is configured, computing a ratio between the first value and the second value.

5. The computer-implemented method of any of clauses 1-4, wherein the second metric comprises a return on investment (ROD ratio, and the first design target comprises a minimum value for the second metric.

6. The computer-implemented method of any of clauses 1-5, wherein performing the sensitivity analysis comprises identifying a first region of the design space that is associated with both the first metric and the second metric, determining a plurality of design options that occupy the first region, and comparing a first set of design features included in the first design option to a second set of design features included in the plurality of design options to determine the plurality of design features.

7. The computer-implemented method of any of clauses 1-6, wherein performing the sensitivity analysis comprises determining a plurality of design options that are associated with the first metric and the second metric, determining a Pareto frontier based on the first metric and the second metric that includes a subset of the plurality of design options, and comparing a first set of design features included in the first design option to a second set of design features included in the subset of design options to determine the plurality of design features.

8. The computer-implemented method of any of clauses 1-7, wherein generating the second design option comprises determining one or more combinations of the plurality of design features that meet the first set of design criteria.

9. The computer-implemented method of any of clauses 1-8, wherein generating the second design option comprises executing a genetic re-combination process with the plurality of design features to generate one or more combinations of the plurality of design features that meet the first set of design criteria.

10. The computer-implemented method of any of clauses 1-9, wherein the second design option includes at least one design feature that is automatically derived by automatically traversing the design space in response to feedback received from a user.

11. Some embodiments include a non-transitory computer-readable medium storing program instructions that, when executed by a processor, cause the processor to generate designs for multi-family housing projects via a computer-aided design (CAD) application by performing the steps of generating, via a design generator included in the CAD application, a first design option based on a first set of design criteria corresponding to a first parcel of land, generating, via a design evaluator included in the CAD application, a first metric that quantifies compliance of the first design option with a first construction regulation, generating, via the design evaluator, a second metric that quantifies performance of the first design option relative to a first design target, performing, via the design generator, a sensitivity analysis on a design space that includes the first design option to determine a plurality of design features that are correlated with the first metric and the second metric, and generating, via the design generator, a second design option that includes the plurality of design features.

12. The non-transitory computer-readable medium of clause 11, wherein the step of generating the first metric comprises computing a first value derived from one or more geometric attributes of a building design included in the first design option, computing a second value derived from one or more geometric attributes associated with the first parcel of land, computing a ratio between the first value and the second value.

13. The non-transitory computer-readable medium of any of clauses 11-12, wherein the first metric comprises a floor area ratio (FAR) or a building coverage ratio (BCR), and the first construction regulation comprises a maximum value for the first metric.

14. The non-transitory computer-readable medium of any of clauses 11-13, wherein the step of generating the second metric comprises computing a first value derived from one or more housing units included in a building design set forth in the first design option, computing a second value derived from one or more structural elements according to which the first design option is configured, computing a ratio between the first value and the second value.

15. The non-transitory computer-readable medium of any of clauses 11-14, wherein the second metric comprises a return on investment (ROI) ratio, and the first design target comprises a minimum value for the second metric.

16. The non-transitory computer-readable medium of any of clauses 11-15, wherein the step of performing the sensitivity analysis comprises identifying a first region of the design space that is associated with both the first metric and the second metric, determining a plurality of design options that occupy the first region, and comparing a first set of design features included in the first design option to a second set of design features included in the plurality of design options to determine the plurality of design features.

17. The non-transitory computer-readable medium of any of clauses 11-16, wherein the step of performing the sensitivity analysis comprises determining a plurality of design options that are associated with the first metric and the second metric, determining a Pareto frontier based on the first metric and the second metric that includes a subset of the plurality of design options, and comparing a first set of design features included in the first design option to a second set of design features included in the subset of design options to determine the plurality of design features.

18. The non-transitory computer-readable medium of any of clauses 11-17, wherein a first generation of design options includes the first design option, and wherein only a subset of design options included in the first generation of design options includes the plurality of design features.

19. The non-transitory computer-readable medium of any of clauses 11-18, wherein a second generation of design options that is derived from the first generation of design options includes the second design option, and wherein each design option in the second generation of design options includes the plurality of design features.

20. Some embodiments include a system, comprising a memory storing a computer-aided design (CAD) application, and a processor that, when executing the CAD application, is configured to perform the steps of generating, via a design generator included in the CAD application, a first design option based on a first set of design criteria corresponding to a first parcel of land, generating, via a design evaluator included in the CAD application, a first metric that quantifies compliance of the first design option with a first construction regulation, generating, via the design evaluator, a second metric that quantifies performance of the first design option relative to a first design target, performing, via the design generator, a sensitivity analysis on a design space that includes the first design option to determine a plurality of design features that are correlated with the first metric and the second metric, and generating, via the design generator, a second design option that includes the plurality of design features.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating designs for multi-family housing projects via a computer-aided design (CAD) application, the method comprising:

generating, via a design generator included in the CAD application, a first plurality of design options based on a first set of design criteria corresponding to a first parcel of land;

generating, via a design evaluator included in the CAD application, a plurality of first metrics that quantifies a degree to which the first plurality of design options comply with a first construction regulation;

generating, via the design evaluator, a plurality of second metrics that quantifies performance of the first plurality of design options relative to a first financial target;

determining, via the design generator, a subset of the first plurality of design options that reside along a first Pareto frontier in a design space based on a first axis that represents a first geometric metric that quantifies a relationship between an area associated with one or more buildings included in the first plurality of design options and an area of the first parcel of land for the first plurality of design options and a second axis that corresponds to a second metric that is included in the plurality of second metrics and is associated with the first financial target;

performing, via the design generator, a sensitivity analysis on the design space to determine a plurality of design features that are correlated with the plurality of first metrics and the plurality of second metrics and contribute to each design option included in the subset;

generating, via the design generator, a second plurality of design options by mutating the plurality of design features included in the subset;

generating a plurality of computer-aided designs based on the second plurality of design options; and causing the plurality of computer-aided designs to be output for display via a graphical user interface.

2. The computer-implemented method of claim 1, wherein generating the plurality of first metrics comprises:
computing a first value derived from one or more geometric attributes of a building design included in the first plurality of design options;
computing a second value derived from one or more geometric attributes associated with the first parcel of land; and
computing a ratio between the first value and the second value.

3. The computer-implemented method of claim 1, wherein generating the plurality of first metrics comprises:
computing a floor area ratio (FAR) or a building coverage ratio (BCR), and
computing a first degree to which a first design option complies with the first construction regulation that comprises a maximum value for the plurality of first metrics.

4. The computer-implemented method of claim 1, wherein generating the plurality of first metrics comprises:
computing a first value derived from one or more housing units included in a building design set forth in the first plurality of design options;
computing a second value derived from one or more structural elements according to which the first plurality of design options is configured; and
computing a ratio between the first value and the second value.

5. The computer-implemented method of claim 1, wherein the plurality of second metrics comprises a return on investment (ROI) ratio, and the first financial target comprises a minimum value for the plurality of second metrics.

6. The computer-implemented method of claim 1, wherein performing the sensitivity analysis comprises:
identifying a first region of the design space that is associated with both the plurality of first metrics and the plurality of second metrics;
determining a plurality of design options that occupy the first region; and
comparing a first set of design features included in a first design option to a second set of design features included in the plurality of design options to determine the plurality of design features.

7. The computer-implemented method of claim 1, wherein performing the sensitivity analysis comprises comparing a first set of design features included in a first design option to a second set of design features included in the subset of the first plurality of design options to determine the plurality of design features.

8. The computer-implemented method of claim 1, wherein generating the second plurality of design options comprises determining one or more combinations of the plurality of design features that meet the first set of design criteria.

9. The computer-implemented method of claim 1, wherein generating the second plurality of design options comprises executing a genetic re-combination process with the plurality of design features to generate one or more combinations of the plurality of design features that meet the first set of design criteria.

10. The computer-implemented method of claim 1, wherein the second plurality of design options includes at least one design feature that is automatically derived by automatically traversing the design space in response to feedback received from a user.

11. The computer-implemented method of claim 1, wherein the first geometric metric represented in the first axis comprises a building coverage ratio (BCR) for the first plurality of design options.

12. One or more non-transitory computer-readable media storing program instructions that, when executed by one or more processors, cause the one or more processors to generate designs for multi-family housing projects via a computer-aided design (CAD) application by performing the steps of:
generating, via a design generator included in the CAD application, a first plurality of design options based on a first set of design criteria corresponding to a first parcel of land;

generating, via a design evaluator included in the CAD application, a plurality of first metrics that quantifies a degree to which the first plurality of design options comply with a first construction regulation;

generating, via the design evaluator, a plurality of second metrics that quantifies performance of the first plurality of design options relative to a first financial target;

determining, via the design generator, a subset of the first plurality of design options that reside along a first Pareto frontier in a design space based on a first axis that represents a first geometric metric that quantifies a relationship between an area associated with one or more buildings included in the first plurality of design options and an area of the first parcel of land for the first plurality of design options and a second axis that corresponds to a second metric that is included in the plurality of second metrics and is associated with the first financial target;

performing, via the design generator, a filtering process on the subset of the first plurality of design options that reside along the first Pareto frontier to exclude one or more design options from the subset based on at least one of the plurality of first metrics or the plurality of second metrics to generate a modified subset;

performing, via the design generator, a sensitivity analysis on the design space to determine a plurality of design features that are correlated with the plurality of first metrics and the plurality of second metrics and contribute to each design option included in the modified subset;

generating, via the design generator, a second plurality of design options by mutating the plurality of design features included in the modified subset;

generating a plurality of computer-aided designs based on the second plurality of design options; and causing the plurality of computer-aided designs to be output for display via a graphical user interface.

13. The one or more non-transitory computer-readable media of claim 12, wherein the step of generating the plurality of first metrics comprises:
computing a first value derived from one or more geometric attributes of a building design included in the first plurality of design options;
computing a second value derived from one or more geometric attributes associated with the first parcel of land; and
computing a ratio between the first value and the second value.

14. The one or more non-transitory computer-readable media of claim 12, wherein generating the plurality of first metrics comprises:
computing a floor area ratio (FAR) or a building coverage ratio (BCR), and computing a first degree to which a first design option complies with the first construction regulation that comprises a maximum value for the plurality of first metrics.

15. The one or more non-transitory computer-readable media of claim 12, wherein the step of generating the plurality of first metrics comprises:
computing a first value derived from one or more housing units included in a building design set forth in the first plurality of design options;
computing a second value derived from one or more structural elements according to which the first plurality of design options is configured; and
computing a ratio between the first value and the second value.

16. The one or more non-transitory computer-readable media of claim 12, wherein the plurality of second metrics comprises a return on investment (ROI) ratio, and the first financial target comprises a minimum value for the plurality of second metrics.

17. The one or more non-transitory computer-readable media of claim 12, wherein the step of performing the sensitivity analysis comprises:
identifying a first region of the design space that is associated with both the plurality of first metrics and the plurality of second metrics;
determining a plurality of design options that occupy the first region; and
comparing a first set of design features included in a first design option to a second set of design features included in the plurality of design options to determine the plurality of design features.

18. The one or more non-transitory computer-readable media of claim 12, wherein the step of performing the sensitivity analysis comprises comparing a first set of design features included in a first design option to a second set of design features included in the modified subset of the first plurality of design options to determine the plurality of design features.

19. The one or more non-transitory computer-readable media of claim 12, wherein a first generation of design options includes the first plurality of design options, and wherein only the modified subset of the first plurality of design options included in the first generation of design options includes the plurality of design features.

20. The one or more non-transitory computer-readable media of claim 19, wherein a second generation of design options that is derived from the first generation of design options includes the second plurality of design options, and wherein each design option in the second generation of design options includes the plurality of design features.

21. A system, comprising:
one or more memories storing a computer-aided design (CAD) application; and
one or more processors that, when executing the CAD application, perform the steps of:
generating, via a design generator included in the CAD application, a first plurality of design options based on a first set of design criteria corresponding to a first parcel of land,
generating, via a design evaluator included in the CAD application, a plurality of first metrics that quantifies a degree to which the first plurality of design options comply with a first construction regulation,
generating, via the design evaluator, a plurality of second metrics that quantifies performance of the first plurality of design options relative to a first financial target,
determining, via the design generator, a subset of the first plurality of design options that reside along a first Pareto frontier in a design space based on a first axis that represents a first geometric metric that quantifies a relationship between an area associated with one or more buildings included in the first plurality of design options and an area of the first parcel of land for the first plurality of design options and a second axis that corresponds to a second metric that is included in the plurality of second metrics and is associated with the first financial target,
performing, via the design generator, a sensitivity analysis on the design space to determine a plurality of design features that are correlated with the plurality of first metrics and the plurality of second metrics and contribute to each design option included in the subset,
generating, via the design generator, a second plurality of design options by mutating the plurality of design features included in the subset,
generating a plurality of computer-aided designs based on the second plurality of design options, and
causing the plurality of computer-aided designs to be output for display via a graphical user interface.

* * * * *